United States Patent [19]

Rodi

[11] Patent Number: 4,733,148

[45] Date of Patent: Mar. 22, 1988

[54] METHOD AND DEVICE FOR BRAKE CONTROL FOR A MOTION-MONITORED AND CONTROLLED DRIVE MOTOR FOR A PRINTING MACHINE

[75] Inventor: Anton Rodi, Leimen, Fed. Rep. of Germany

[73] Assignee: Heidelberger Druckmaschinen AG, Heidelberg, Fed. Rep. of Germany

[21] Appl. No.: 865,145

[22] Filed: May 20, 1986

Related U.S. Application Data

[63] Continuation-in-part of Ser. No. 812,126, Dec. 23, 1985, abandoned.

[30] Foreign Application Priority Data

Dec. 22, 1984 [DE] Fed. Rep. of Germany ....... 3447090

[51] Int. Cl.⁴ .............................................. F16D 66/00

[52] U.S. Cl. .......................................... 318/490; 192/2

[58] Field of Search ................ 73/121; 192/2; 303/92; 318/490; 324/73 R; 364/426, 551, 580; 371/15, 25

[56] References Cited

U.S. PATENT DOCUMENTS

| | | | |
|---|---|---|---|
| 3,942,111 | 3/1976 | Pfouts | 318/490 X |
| 4,320,506 | 3/1982 | Farazi et al. | 303/92 X |
| 4,340,935 | 7/1982 | Anlauf et al. | 303/92 X |
| 4,389,710 | 6/1983 | Rasmussen | 303/92 X |
| 4,528,486 | 7/1985 | Flaig et al. | 318/439 X |

FOREIGN PATENT DOCUMENTS

| | | | |
|---|---|---|---|
| 0077736 | 4/1983 | European Pat. Off. | 364/580 |
| 57-32383 | 2/1984 | Japan | 318/490 |

*Primary Examiner*—Bentsu Ro

*Attorney, Agent, or Firm*—Herbert L. Lerner; Laurence A. Greenberg

[57] ABSTRACT

A method and device for checking the brake of a motion-controlled and monitored printing press drive motor includes a processor unit which is connected on its input side to a motion signal generator and a motion control panel, and is connected on its output side with the drive motor and associated motor brake via a power output stage which is configured as a power converter. The processor unit generates the control signals for the motor and brake. Before each starting operation and with the brake still applied, a momentary small nominal power motion value is fed as a test value to the drive motor and subsequently the actual motor motion values are measured. If actual motion is detected, the brake torque is not sufficient, the system generates an error message and it switches the drive motor off. If no motion is detected, the motor brake is released, the nominal power value is maintained and the motion of the drive motor is re-checked. If motion still does not take place, the motor brake has not released properly, whereupon the system generates an error message and stops the drive motor. If motion is $> |0|$, the motor brake function check is completed and the drive motor is run up to the desired motion values.

11 Claims, 20 Drawing Figures

METHOD AND DEVICE FOR BRAKE CONTROL FOR A MOTION-MONITORED AND CONTROLLED DRIVE MOTOR FOR A PRINTING MACHINE

This is a continuation-in-part application of application Ser. No. 812,126 filed Dec. 23, 1985, now abandoned.

BACKGROUND OF THE INVENTION

The invention relates to a method and a device for monitoring the brake of a motion-monitored and controlled printing press drive motor.

Because of safety regulations rotary machines such as offset printing machines must have their drive trains equipped with a switchable motor brake. This serves on the one hand as a parking or locking brake to safeguard the operator against accidental starting of the machine, and on the other hand as an emergency brake which enables the machine drive to be decelerated and stopped as quickly as possible in an emergency.

Such motor brakes consist normally of brake discs lined with friction material which in a non-powered condition are pressed together by springs. The required brake force is generated by the friction between the two brake discs. When a voltage is applied to the brake the brake discs are axially moved apart against the force of the compression springs thus releasing the brake force.

For function-checking this type of motor brake, limit switches are provided which sense the position of at least one of the movable brake discs. The starting of the drive motor is, for instance, prevented if the brake discs do not move apart after the voltage is applied and thus do not actuate the limit switch or switches which then cannot signal the release of the motor brake.

The disadvantage of such a brake checking system lies in the fact that only the actual position of the brake discs in relation to one another can be monitored; any information on the function of the motor brake and the braking force produced by it is not available because the limit switch or switches are not capable of detecting a reduction of the friction lining thickness produced by normal wear and tear, or any other defects such as contamination of the linings by oil. Apart from that, a wrong positioning of the limit switch or switches or an alteration of the switching points after they have been in operation some time, cannot be entirely excluded, and therefore a certain lack of operational safety is to be expected.

SUMMARY OF THE INVENTION

In order to overcome the above described disadvantage, the invention provides a low-cost method and device with which to retrofit printing press drive motors, which, irrespective of the wear pattern, provides an absolutely safe function check of the motor brake to be carried out in the shortest possible time.

Based on the method disclosed herein, this problem is solved according to the inventive concept, thereby that, before and during the starting of the drive motor, the motor is checked for permissible and impermissible motion both with the brake applied and released, and that, according to the result of the control check, error signals are generated which affect the drive. The problem is solved in accordance with one preferred embodiment by providing a control logic circuit which on its input side is coupled to a motion signal generator (tachometer) coupled to the motor and a motion control panel, and on its output side with the drive motor and its motor brake via a power control stage.

This method as well as the device enabling it to be put into practice makes a considerable contribution to increasing the operational safety of the printing machine since the brake system is continually monitored and is with each machine start, automatically re-checked without any intervention by the operators. A further advantage lies in the fact that apart from any normal wear of the brake linings, any other mechanical and electrical faults impairing the function of the motor brake can be detected which helps to increase the life of the motor and prevent overloading—e.g. if the motor brake is only partially released or not at all—and can help avoid excessive wear of the brake linings.

As a logical further development of the invention, a given nominal power value is fed to the drive motor for the purpose of the function check and subsequently the drive torque of the motor is reduced to meet this requirement; subsequently the resulting drive motor motion is checked at least once.

The invention may be developed from the following steps:

1. Generating a motor start signal:
2. Generating as a test value a given nominal power value in the form of a signal which is proportional to a small motion motor drive requirement for the motor;
3. Motion check of drive motor;
4. Generation of error message if false motor motion is detected;
5. Removal of test power value and generation of a motor stop signal;
6. Venting of motor brake if no false motor motion has been detected;
7. Maintaining the nominal power value as a test value;
8. Motion re-check of drive motor;
9. Generation of error message if no permissible motor motion is detected;
10. Removal of test power value and generation of a motor stop signal;
11. If a permissible motor motion is detected during the tests, the power value is increased in accordance with the required normal drive power of the drive motor.

In this simple way it is possible to check by a first test before starting the drive motor to normal operating power whether the brake torque of the motor brake is still sufficient; a second test checks whether the motor brake actually releases when the drive motor is started.

In order to exclude overloading the drive motor, a further embodiment of the device according to the invention is provided, wherein the computing device is combined with a processor unit, by means of which the motor brake control, disposed ahead of the motor brake, can be controllingly engaged. Further still, it is possible, by means of the logic switching circuit to limit the driving moment of the motor as well as presetting the nominal drive force by the power control converter.

This device can be retrofitted into any starting routine of printing machine drives. In the case of printing machines having a start warning system, the first check of the brake torque should preferably take place during the start warning period, whereas the second check of brake release should fall into the starting phase of the motor immediately after completion of the first check.

In the preferred embodiment the method of controlling the brake of a motion-controlled and monitored printing press drive motor, includes that the motor motion is checked before and during starting with applied and released motor brake, and depending on the results of the check the system will generate appropriate control and/or error signals.

According to a further embodiment of the invention it is provided that for checking the motion of the drive motor, at least one nominal power value is selected and subsequently the nominal power value and the drive torque of the motor is reduced simultaneously to meet the requirement that with brake operated during application of nominal power value no false motor motion is detected and finally at least one motion check of the drive motor with brake off is performed.

According to another embodiment of the invention it is further provided that a motor start signal is generated, and as a test value, a given nominal power value in the form of a signal which is proportional to a small motion of the motor is generated, and a motion check of the drive motor is performed; and generation of an error message is made if a false motor motion is detected; the nominal test value is removed and a motor stop signal is generated; this is followed by venting of the motor brake if no false motor motion has been detected; and then applying a given power value as a test value; rechecking the drive motor; generating an error message if impermissible motor motion is detected; removal of the nominal power value and generating a motor stop signal; and if a permissible motor motion is detected, the nominal power value is increased in accordance with the required operation of the drive motor.

According to another embodiment of the invention, it is further provided that the drive motor motion is rotational or translational, the rotational motor motion being checked using the angular displacement "$\alpha$" and the speed "n" and the translational motor movement being checked using the linear motion travel "S".

According to a further embodiment of the invention it is provided that a DC motor is used as the drive motor and rotor voltage feedback is being used as a motion value signal.

According to an added embodiment of the invention, the device for checking the brake of a motion-controlled and monitored printing press drive motor is equipped with a motor brake and a motion control driven by a motion signal, and a processor unit is provided which on the input side is connected to a motion signal generator and a motion command input, and on the output side to the drive motor and the motor brake via a power control converter.

According to again an additional embodiment of the invention, it is further provided that the control logic is equipped with a processor unit controlled by the control panel, which is coupled to the brake control of the motor brake, which is coupled to a device for limiting the motor drive torque and which is coupled to a computing unit for providing a nominal power value from a power control converter, the latter being connected in addition to a motion signal matching unit fed by the motion signal generator in the form of a tachometer or the like.

According to again an added feature of the invention, it is provided that the processor unit chains and interlocks the control commands entered via a control panel according to their priority and form signals for the brake control for driving the motor brake as well as for a nominal motion power value setting device, which are in turn linked with the output signals generated by motion signal matching means for providing the nominal power values for the drive motor, and in that via the processor unit the output signals of the nominal power value processor unit may be used to control a motor torque limiter which provides that limiting of the drive torque of the power output stage can be altered.

According to yet another feature of the invention, it is provided that the power output stage is configured as a power control converter with adjustable current limiting.

According to yet an additional feature of the invention, it is provided that the drive motor may be either a rotary or a linear motor.

Other features which are considered as characteristic for the invention are set forth in the appended claims.

Although the invention is illustrated and described herein as embodied in a method and device for brake control for a motion-monitored and controlled drive motor for a printing machine, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which.

DESCRIPTION OF THE PREFERRED EMBODIMENT

In the following example the speed "n" of the drive motor is used as the motion value. The functional sequence would in principle be the same, however, if one would use instead the displacement angle "$\alpha$" or the linear travel "S" in the case of a linear motor.

Figure 1:
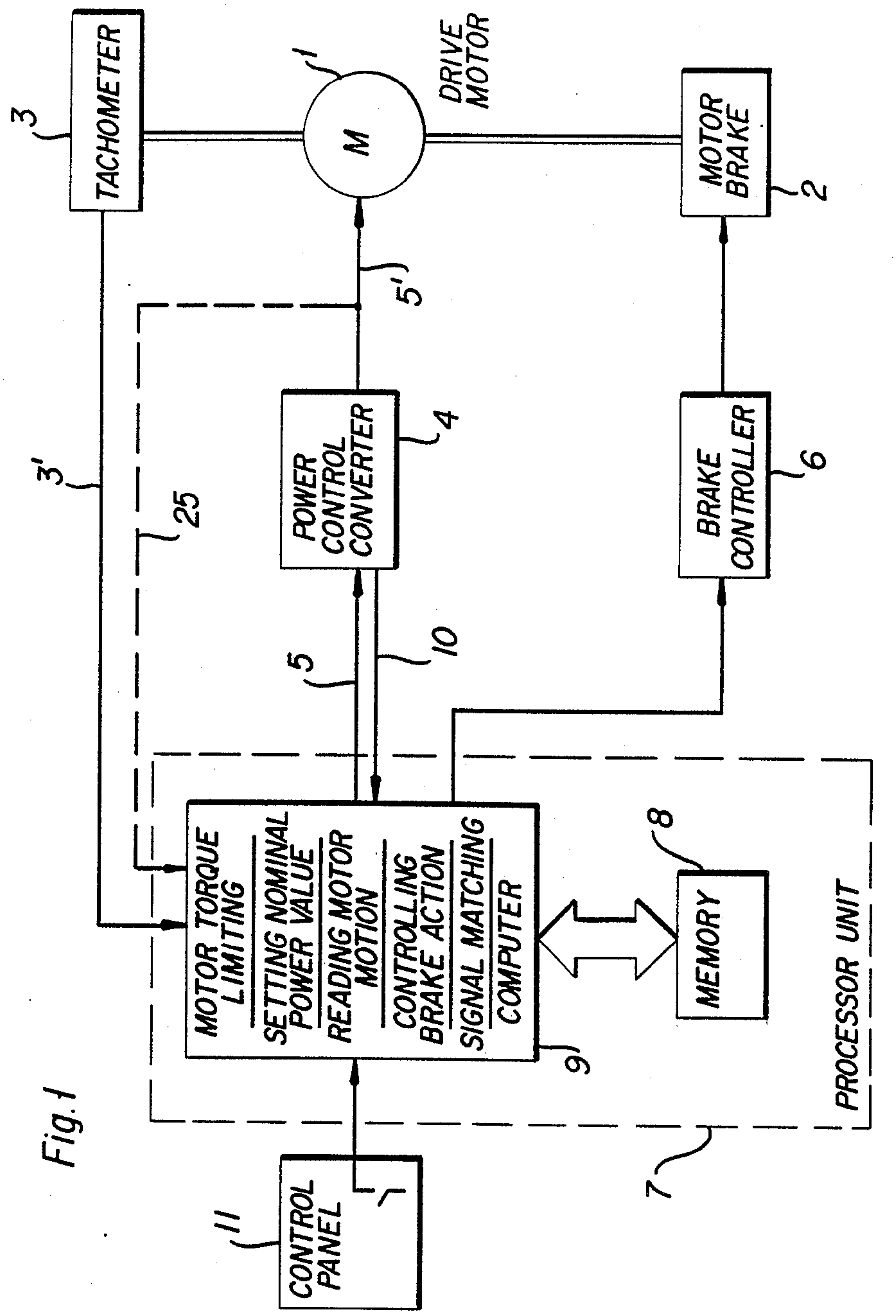
FIG. 1 is a schematic block circuit diagram of a brake checking device in accordance with the invention.
Figure 2:
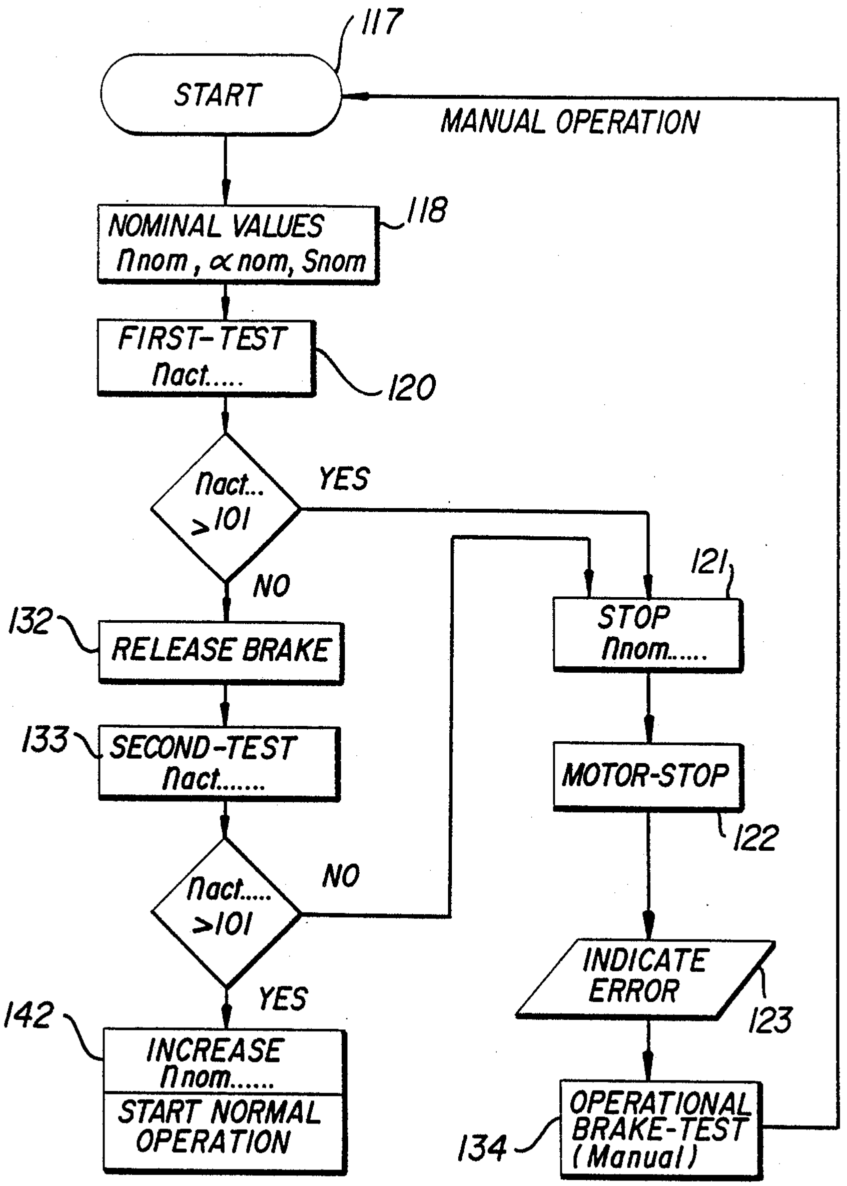
FIG. 2 is a flow chart of the phases of the brake check.

In accordance with FIG. 1, the drive motor 1 is a variable speed motor which may be a DC motor. The drive motor 1 is equipped with a motor brake 2. Its motion, i.e. the speed, is checked using a motion signal generator 3 (in this case a tachogenerator). The speed check can, however, be made using the drive voltage—in the case of a DC motor the rotor voltage feedback—which is shown in FIGS. 1 and 2 by the dotted line marked "25".

The drive motor 1 is fed by a power control converter 4 configured as a power converter which is known to those skilled in the art. The power converter may be replaced by a frequency converter or other power output stages producing the same effect provided the appropriate drive motors are used.

For control of the power control converter 4 and the motor brake 2, respectively, the brake controller 6, a conventional "off-the-shelf" single board computer is used as the processor unit 7. The latter includes a computer 9 with a memory 8 (e.g. of the type SBC 86/12 from the firm Intel, Santa Barbara, Calif.).

The latter receives input commands from the control panel 11. The latter includes in conventional manner keys, switches and/or dials, with potentiometers or similar electronic control devices, which enable the operator, to control, among other things, the speed of the machine and to enter commands, such as "switch on", "faster", "slower", "forward", "reverse", "stop", "no-stop", and others.

The processor unit 7, in this way, receives as input the actual current value to the motor 1 transmitted by the power control stage 4 via lead 10 as well as the actual rotational speed value from the tachogenerator 3 via lead 3'. Instead of using the tachogenerator 3, the rotational speed of the motor can be measured by means of the armature counter −EMF transmitted via lead 25. The input signals are processed, computed and stored in the processor unit 7 in accordance with their established priorities and applied for steering of the brake controller 6, and are also connected to the power control stage 4.

The control signals applied to the brake controller 6 are amplified to the level required and connected to the motor brake 2.

In regard to the power supplied by the power control converter 4 over the power line 5, this power represents a nominal desired degree of movement that has been determined by the processor unit 7 on the basis of the following inputs: desired RPM, indicated by the tachogenerator 3 via lead 3' (or alternatively the armature counter EMF reported via lead 25), and the actual current value, indicated on lead 10. In response to these nominal motion values, the power control stage 4 produces an output voltage on power lead 5', or a corresponding output current for driving the drive motor 1, in response to a control signal on control lead 5 from the computer 9 to the power control converter 4.

A further control signal is transmitted to the power control stage 4, transmitted over the control lead 5 which serves to limit the current sent to the motor 1.

The function of the device described above as well as the brake check phases are described below using FIGS. 3–20.

The phases of the first and second check of the motor brake 2 and their timing sequence are shown in FIG. 2; the individual steps shown in FIG. 2 have reference numerals corresponding to the phases shown in FIGS. 4–15, but with a "1" prefaced thereto.

The functional descriptions refer exclusively to speed feedback using the tachogenerator 3. The function sequence is in principle the same if rotor voltage feedback 25 is used instead of the tachogenerator 3.

Figures 3, 4, 5, 6, 7, 8, 9, 10, 11, 12, 13, 14:
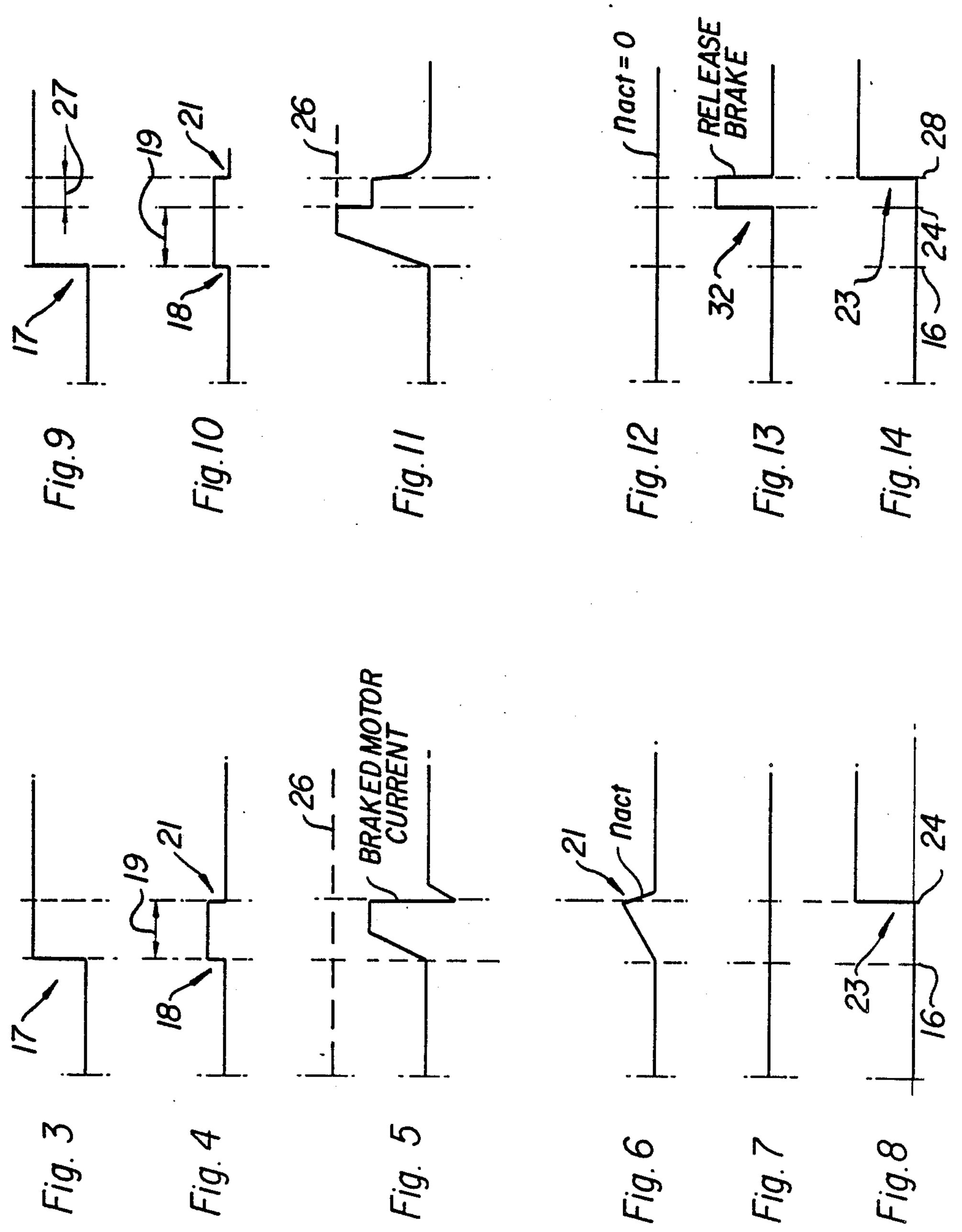
FIGS. 3–8 are graphs of the pre-start brake check showing fault conditions.
FIGS. 9–14 are graphs for post-start brake check showing fault conditions.

By operating the "start" button at time point 16 (FIGS. 3–20), a motor start signal 17 is generated (FIG. 3). In accordance with step 118 the processor unit 7 automatically feeds for a short period 19 a nominal speed value $n_{test}$ in the form of a small voltage signal 21 (FIG. 4), in relation to which the power control converter 4 generates a supply voltage or current which is sufficiently high to drive the motor 1. The supply voltage or current fed to drive motor 1 serves as a test value and is limited by the motor torque limiter (FIG. 1) in such a way that the motor 1 will start freely with the brake 2 released or will just turn if motor brake 2 is not entirely effective.

Since at this moment the processor unit 7 has not yet sent the signal "release brakes" to the brake controller 6 and from there to the motor brake 2, the drive motor 1 must not normally turn, i.e. if motor brake 2 is working properly. If motor brake 2 is not entirely effective, e.g. because of normal wear, the drive motor 1 will start running at speed $n_{actual}$ (see FIG. 6) drawing a current (shown in FIG. 5) which is limited by the torque (i.e. current) limiting to the range below the current limit value 26.

After period 19 (FIG. 4) this function is checked according to function step 120 (FIG. 2) as follows: Tachogenerator 3 (FIG. 1) measures the motor speed $n_{actual}$ and feeds this signal to the processor unit 7 in which the actual speed check is carried out. If the processor finds that the motor speed $n_{actual}$ is greater than 0, the motor brake 2 remains non-vented (see FIG. 8), i.e. it remains applied, and the test speed value $n_{test}$ is removed (function step 121) by the fact that the processor unit 7 prevents a further nominal speed value being issued to power control converter 4.

At the same time a motor stop signal (step 122) is generated causing the actual speed value $n_{actual}$ shown in FIG. 1 to drop to 0. The drive motor 1 is braked by the motor current (FIG. 5). Simultaneously an error signal 23 is generated (FIG. 8) shown as step 123, which alerts the printing machine operators acoustically and/or visually to a brake malfunction at time point 24 of the first speed check.

In the second function check of motor brake 2 the function steps 117–120 (FIG. 2) including the first check of the speed actual value $n_{actual}$ of drive motor 1 are the same. If follows that the graphs of FIGS. 3 and 4 essentially correspond to FIGS. 9 and 10 with the difference that after time period 19 of the test speed set value $n_{test}$ for the first function check of motor brake 2, a further time period 27 is provided for the second brake check. This period lasts up to the point marked 28 at which a second speed check in step 33 of drive motor 1 takes place. The removal of the nominal test speed value $n_{actual}$ is identified by reference number 21 in FIG. 10, and by step 121 in FIG. 2.

If during the first speed check the tachogenerator 3 has—in accordance with the first functional step 120 of the flow chart of FIG. 2—detected an actual speed value of drive motor 1 (in this case $n_{actual}=0$) (FIG. 12), the motor brake 2 still has a sufficiently high braking torque which may be taken as proof for sufficient braking power. The processor unit 7 triggers another nominal speed value as an output signal and allows the maintenance of the test value $n_{test}$, and additionally the brake controller 6 will release motor brake 2 in the next function step 132 at 32 at time point 24 (FIG. 13). Simultaneously the current limit 26 is adjusted to the value of the maximum drive current. FIG. 11 shows in principle the current consumption curve of drive motor 1 with effective current limiting.

Now starts the second speed check in step 133 of drive motor 1 using tachogenerator 3. This check is to determine whether motor brake 2 has actually released and that drive motor 1 runs after the command "release brakes" has been given. If the system detects during this second speed check step 133 that drive motor 1 does not rotate and therefore does not produce an actual speed value $n_{actual}$ (i.e. the absolute value is greater than 0) the nominal test speed value $n_{test}$ is, similarly to the previous first brake check at time point 28 and function step 121, removed by the processor unit 7 from further issuing of nominal speed values to the power output, stage 4. Additionally a motor stop signal issued in step 122 is triggered and an error signal 23 (FIG. 14) is generated and indicated in step 123. Since the drive motor 1 does not have to be braked using its motor current, the value of the current drops to 0 (FIG. 11). Furthermore the command "release brake" (step 132) is cancelled (FIG. 13).

After triggering of the error signal 23 in step 123 a check of the brakes by the operating or maintenance personnel has to be carried out in the form of a further process step 134. Depending on the result of this check, the motor start step 117 must manually repeatedly be initiated.

The graphs of FIGS. 15–20 illustrate a brak check without fault condition.

Figure 15:
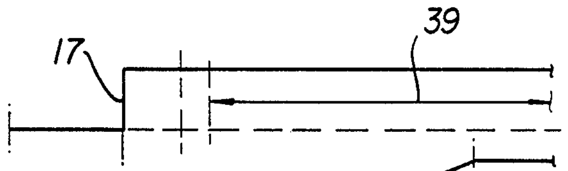
FIGS. 15–20 are graphs for brake check without any fault condition.
Figure 16:
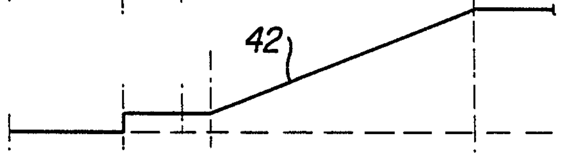
Figure 17:
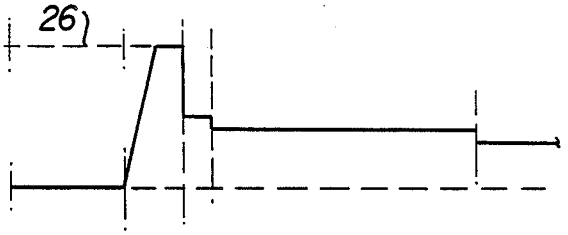
Figure 18:
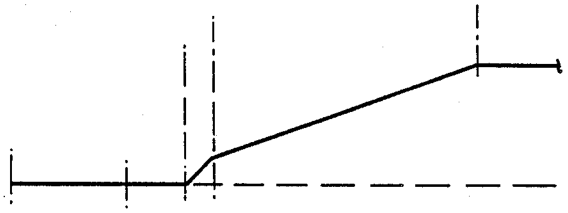
Figure 19:
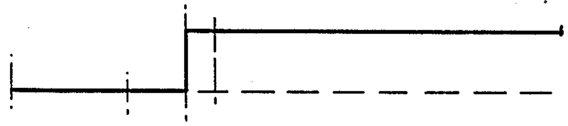

FIG. 15 shows the motor start signal 17 from the moment of triggering 16 via the first and second speed checks in steps 120 and 133 of FIG. 2, respectively, and including an additional machine running period 39. The course of the graph in FIG. 16 shows clearly that with the second brake check completed and motor brake 2 intact at time point 28, the nominal test speed value $n_{test}$ fed as a voltage signal, is increased to the desired operating speed set value $n_{set}$ (function step 142 of FIG. 2) with which the printing machine is to be run. FIG. 17 shows schematically the motor current curve. The relationship between the size of the motor current and the torque requirement is sufficiently well known and therefore needs no detailed description.

Figure 20:
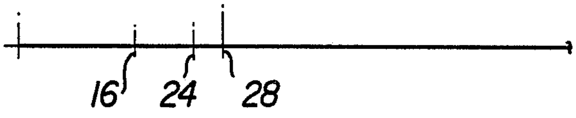

If both speed checks 20 and 33 have been completed satisfactorily, i.e. $n_{actual}$ is $|0|$ during the first speed check (step 120) and is $>|0|$ during the second speed check 133, that the drive is released, run up to the actual speed value $n_{actual}$ (see graph in FIG. 18) and matched to the operating speed set value $n_{set}$ until it has reached a constant nominal speed (FIG. 2, function step 142), the normal motor operation is available. FIG. 20 shows the curve of the brake signal together with the signal jump caused by the command "release brakes" at time point 24. In accordance with the graph in FIG. 20 and as already described above, no error signal is generated during a satisfactory brake check (FIGS. 15–19).

It is self-evident that the invention is not limited to the version described herein and illustrated by the figures. The scope of the invention encompasses numerous constructional modifications such as, for instance, the use of commercial equivalent electromechanical and electronic components.

I claim:

1. Apparatus for checking the operation of a brake for a motor for a printing press, comprising a motion signal generator coupled to the motor for producing a motion signal; a processor unit operatively responsive to said motion signal; a start switch connected to the processor unit for producing a motor start signal; the processor unit having a processor unit output; motor control means including a power converter being responsive to the processor unit output, having an output for controlling the motor; and the processor unit further having a brake output for checking the brake of the printing press motor.

2. Apparatus according to claim 1 further comprising:

a computer unit included in the processor unit a brake controller included in the processor unit operatively connected to the brake, a motor drive torque limiter included in the processor unit operatively engaging the power converter for limiting the motor drive torque, a nominal power value processor included in the processor unit operatively engaging the power converter for controlling the power output to the motor, a motion signal matching unit included in the processor unit operatively responsive to the motion signal generator and having an output for operatively engaging the power converter for additionally controlling the power output to the motor.

3. Apparatus according to claim 2 further including a control panel for entering control commands, means for interlocking and chaining said commands included in said processor unit according to the priority of said commands, means for forming signals for operating the brake included in the brake controller, said control commands further being linked with the output signal from said motion signal matching unit for controlling the nominal power value processor which in turn controls the motor drive torque limiter for allowing the motor drive torque to be altered.

4. Apparatus according to claim 1 wherein said power converter comprises means for adjustably limiting the motor drive current.

5. Apparatus according to claim 1, wherein said motor is selected from the group of motors consisting of rotary motors and linear motors.

6. Method for testing the operation of a brake for a drive motor having means for sensing the motion, and means for controlling the motion of the motor, comprising the steps of: engaging the brake; applying to the motor a current of a given first value; sensing as a first sensing step the motion of the motor; disengaging the brake; applying to the motor a current having a given second value being less than said given first value; sensing as a second sensing step the motion of the motor; and generating an error signal of in at least in said first sensing step motor motion is sensed, and in said second sensing step no motor motion is sensed.

7. Method according to claim 6 further comprising the steps of:

selecting a nominal motion value for the motor;

applying as said given first current value a nominal current such that the motor turns at said selected motion value with the brake applied to the motor;

reducing the drive torque of the motor;

monitoring at least once the motion of the motor and recording the value of drive current when the motor stops.

8. Method according to claim 7, further comprising:- the steps of (a) generating a motor start signal, (b) generating a nominal motion value signal that is proportional to the motion value of said motor, (c) monitoring said nominal motion value signal, (d) selecting a permissible motor motion value, (e) generating an error signal if motor motion value greater than said selected permissible motor motion value is monitored, (f) removing said motor start signal, (g) venting the motor brake if permissible motor motion value has not been exceeded, (h) resuming said nominal current to the motor, (i) remonitoring the motion of the drive motor, (j) generating an error message if impermissible motor motion is detected, (k) removing the nominal current to the motor and generating a motor stop signal, (l) increasing motor drive current to normal operation if permissible motion is detected.

9. Method according to claim 8, wherein said motor is a DC-motor, comprising generating said nominal motion value signal from a rotor voltage feedback signal.

10. Method according to claim 6 wherein said motor is a rotational motor, comprising checking an angular displacement as motion of the motor.

11. Method according to claim 6 wherein said motor is a translational motor, comprising checking a linear displacement as the motion of the motor.

* * * * *